May 25, 1937.  P. SERRE  2,081,253
DISTRIBUTING DEVICE
Filed Jan. 8, 1936  3 Sheets-Sheet 1
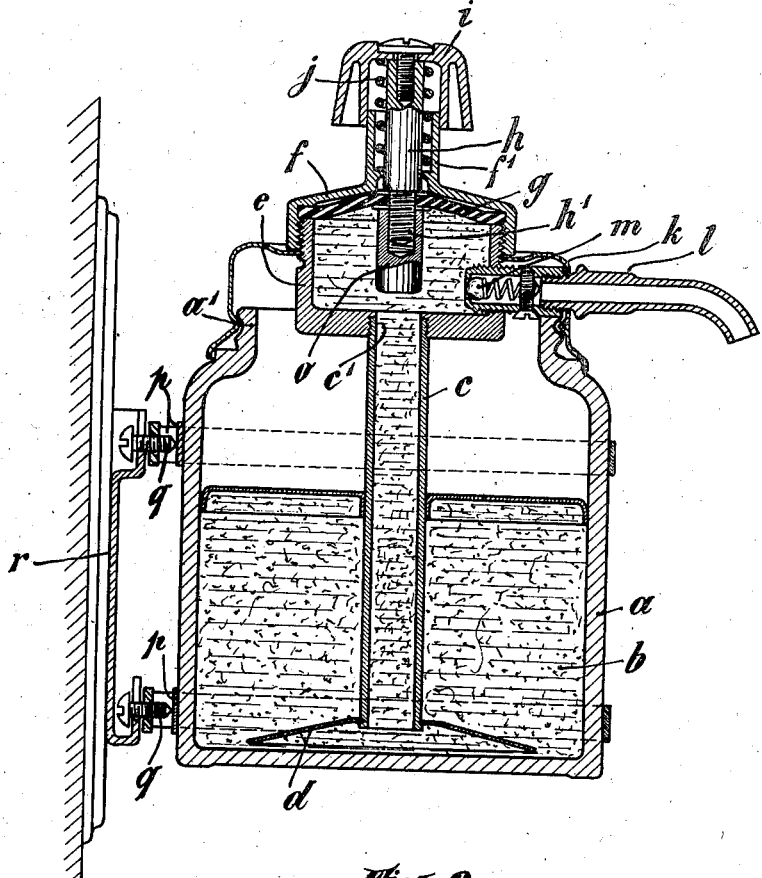
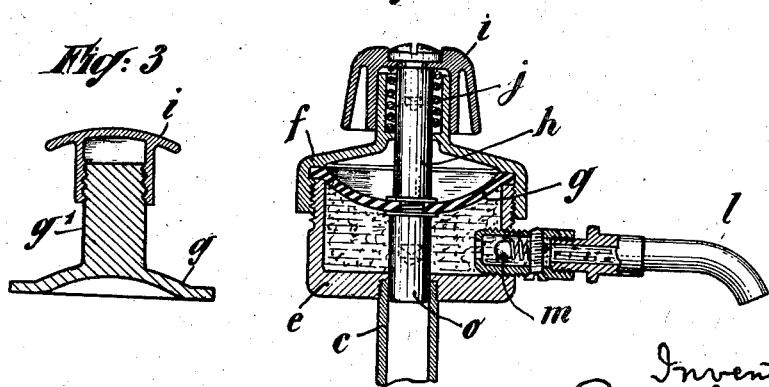
Inventor:
Paul Serre
By Mauro + Lewis
Attorneys May 25, 1937.  P. SERRE  2,081,253
DISTRIBUTING DEVICE
Filed Jan. 8, 1936  3 Sheets-Sheet 2
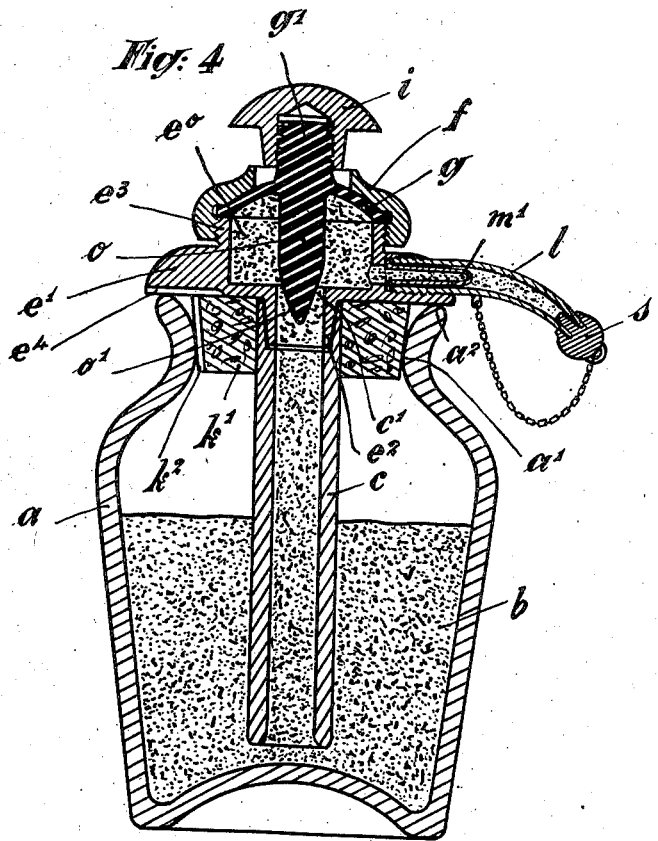
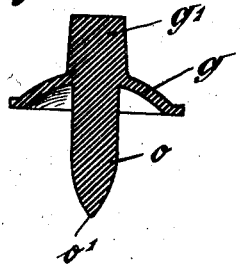
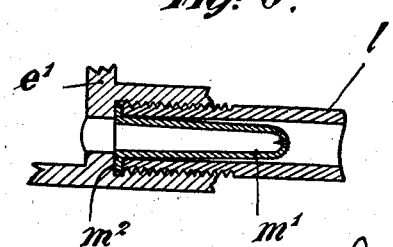

May 25, 1937.  P. SERRE  2,081,253
DISTRIBUTING DEVICE
Filed Jan. 8, 1936  3 Sheets-Sheet 3
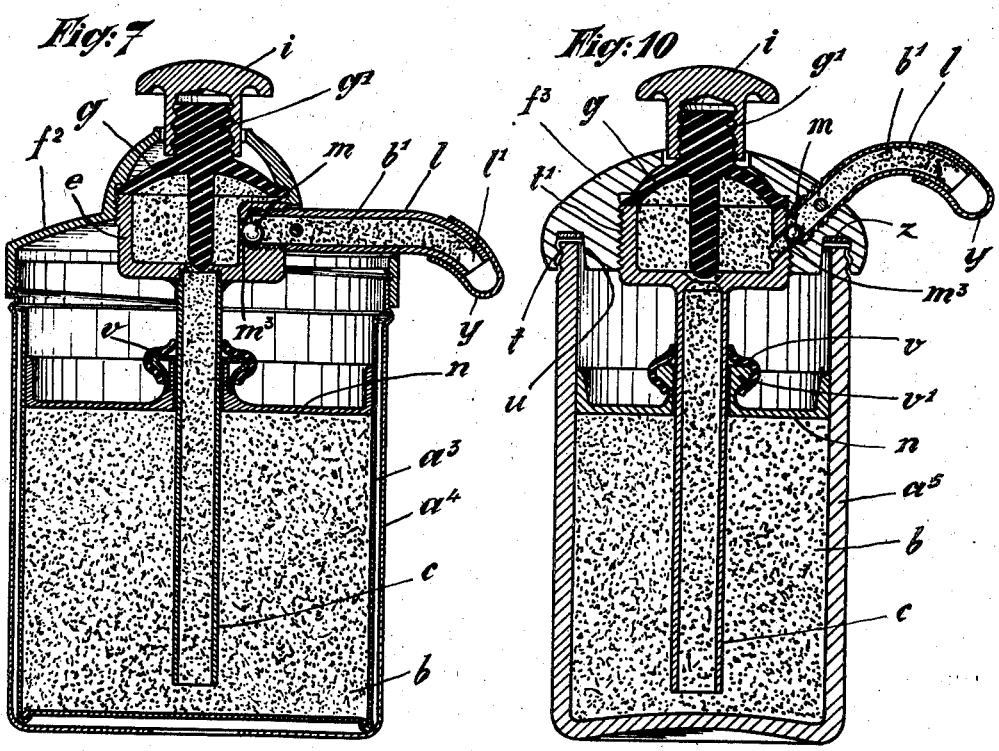
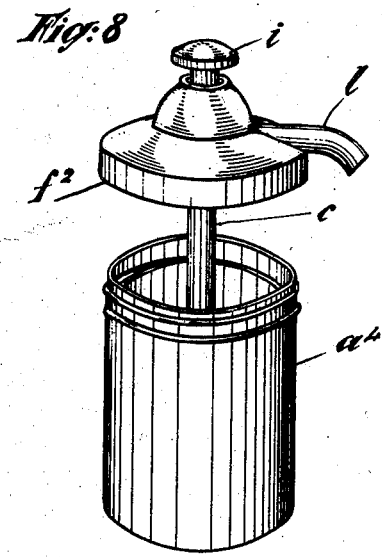
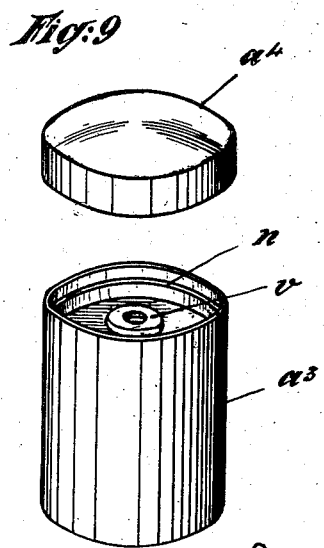

Patented May 25, 1937

2,081,253

UNITED STATES PATENT OFFICE 2,081,253

DISTRIBUTING DEVICE

Paul Serre, Paris, France

Application January 8, 1936, Serial No. 58,209
In France April 16, 1935

20 Claims. (Cl. 221—102)

There exist distributing apparatus for liquids or pasty products which include a vessel provided with a central plunger tube with an inlet valve, leading to a chamber fixed to the upper part of the vessel and including a membrane the displacement of which is controlled by a push button.

A conduit fitted with a discharge valve is connected to said chamber and opens on the outside, for the distribution of the cream or pasty matter.

Now I have found that, if these apparatus are wholly satisfactory in the case of vessels containing a liquid, the same is not true in the case of vessels containing a cream or pasty matter.

The present invention relates to distributing apparatus of the kind above referred to.

Its object is to provide an apparatus of this kind which is better adapted to meet the requirements of practice, and especially an apparatus for the distribution of a cream or a pasty matter capable of discharging, every time, a well determined quantity of said matter, so that the apparatus also constitutes a dosing or measuring apparatus.

According to a first feature of the present invention, the check valve or ball valve of the plunger tube is done away with and it is replaced by a rod acting as a piston and disposed along the axis of the membrane, which rod is adapted to engage into the upper end of the plunger tube on a distance of some millimeters.

It will be readily understood that, with this arrangement, the displacement of this piston produces in the plunger tube a very strong suction during the period of lifting of the membrane, and that, during the discharge, a very accurately dosed amount of matter shall be discharged from the apparatus. In this way, I avoid the disadvantages inherent in a ball valve or check valve, the working of which in a pasty matter is very unreliable.

Furthermore, the membrane may be provided with a flexible vertical projection to which the push button is fixed, which dispenses with the necessity of a return spring.

Furthermore, an annular member, mounted in said vessel with an easy fit, is adapted to slide along the plunger tube, said member moving downwardly together with the upper level of the matter contained in said vessel, either under the effect of suction, or under the effect of its own weight.

According to another feature of the invention, the lower end of the plunger tube is fitted with a cowl or screen intended to avoid the formation of an air pocket close to the tube and to enlarge the region in which a suction is produced.

In order to simplify the manufacture and to reduce the cost of the distributing apparatus according to the present invention, I may, with advantage, make use of a membrane of rubber including both a flexible vertical projection on which the push button is fixed and another projection, preferably of pointed shape, forming the piston above referred to, and which, every time a dose of matter is discharged, penetrates into the plunger tube so as to create therein the desired suction when the membrane is lifted.

Furthermore, according to still another feature of the present invention, the lid is made of wood and it is provided with a boss of suitable shape adapted to be engaged, like a cork or the like, into the neck of a vessel of any kind, such for instance as a mustard pot.

In this case, in order to avoid deterioration of the ball check valve past which the matter is discharged by the corrosive action of the matter to be distributed, this check valve is advantageously replaced by a rubber valve having preferably the shape of a split nipple.

In order to render the use of the distributing apparatus according to the invention as economical as possible, the charge of matter to be distributed may be contained in a removable vessel which will be housed inside the body of the distributing apparatus. The distributing apparatus can therefore be reutilized when the whole of the matter has been discharged. It will suffice to replace the empty removable container by another one filled with the matter.

The distributing device may be decorated in any suitable manner so as to give it an appearance in accordance with the use for which it is intended.

It will be readily understood that the replacement of the charge of matter to be distributed is economical because the removable container of said charge may be made as cheap as it may be desired.

When making use of a wooden lid, as above stated, it is advantageous to devise it in such manner that it may have a fluidtight fit on the vessel containing the matter to be distributed, this arrangement being especially necessary when the matter is viscous and the distributing device is to be transported in a luggage.

For this purposes, according to the present invention, the lid is provided with a deep groove or furrow at the bottom of which is inserted a packing annular member adapted to be applied against the edge of the vessel or container, generally of glass, which contains the viscous matter above referred to. The lid may be fixed to the vessel or container by screwing, as in the case of an ordinary lid.

Preferred embodiments of the present invention will be hereinafter described, with reference to the accompanying drawings, given merely by way of example, and in which:

Fig. 1 is a vertical sectional view of a first embodiment of the invention;

Fig. 2 is a corresponding partial view, showing the position of the push button and the membrane after a certain amount of the pasty matter has been expelled from the apparatus;

Fig. 3 is a detail view of a modification of the push button;

Fig. 4 is a vertical sectional view of a distributing device including a container, of any shape whatever, for the matter to be distributed, upon which container is mounted the special lid through which the distribution is effected;

Figs. 5 and 6 are corresponding detail views;

Fig. 7 is a vertical sectional view of a distributing device according to the present invention provided with a removable container;

Fig. 8 is a perspective view of the body of the distributing device and its lid;

Fig. 9 is a perspective view of the removable container and its lid;

Fig. 10 is a vertical sectional view of a distributing device in which the lid is arranged to ensure a fluidtight closing of the vessel.

In the embodiment of Figs. 1 and 2, the distributing device includes a vessel $a$ containing the pasty or liquid matter $b$ to be distributed. Coaxially with this vessel, there is arranged a plunger tube $c$, provided at its lower end with a screen $d$. The upper end $c^1$ of tube $c$ is fixed in the bottom of a chamber $e$ provided with a lid $f$. Between the upper edge of box or chamber $e$ and lid $f$, the edge of the slightly concave rubber membrane or plate $g$ is caught.

Lid $f$ is provided with a prolonged part $f^1$ in which the rod $h$ of the push button $i$ can slide, said push button being subjected to the action of return spring $j$. A cap $k$ is arranged to be screwed on the neck $a^1$ of vessel $a$ and closes said vessel in a manner which is not fluidtight, so as to permit air to enter the vessel as the level of the pasty matter $b$ in said vessel is dropping.

The inside of chamber or box $e$ can communicate with the tube $l$ for the discharge of the matter through a discharge valve $m$, constituted in this embodiment by a ball subjected to the action of a spring.

A rod or piston $o$ is provided in the axis of chamber or box $e$, said piston being rigidly connected to the membrane. For instance, piston $o$ is screwed to the threaded end $h^1$ of rod $h$ which extends through said membrane.

The operation of this dosing apparatus takes place in the following manner:

Chamber $e$ and vessel $a$ being filled with the matter to be distributed, push button $i$ is depressed. From the time when piston $o$ stops the end $c^1$ of the plunger tube, the matter is discharged through tube $l$ and driven out. When the button has been brought to the end of its downward stroke, as shown by Fig. 2, spring $j$ brings it back into its initial position and it is clear that the displacement of piston $o$ in tube $c$ produces a strong suction which causes a predetermined amount of pasty matter to flow upwardly into chamber $e$, which amount of matter shall be subsequently driven out by depressing again button $i$.

The apparatus above described may be either portable, and for instance merely posed on a table, or fixed to a vertical wall or other structure. In the latter case, vessel $a$ may be maintained in position by a collar $p$ provided with screws $q$ adapted to be engaged in the slots of a support $r$ fixed to the surface of the wall.

In the modification shown by Fig. 2, membrane $g$ is prolonged outwardly by a small cylindrical block of rubber $g^1$ on which button $i$ is directly fixed or screwed, so that spring $j$ can be dispensed with.

Of course, the whole of tube $c$, chamber $e$ provided with its membrane $g$, push button $i$ and tube $l$ might be disposed at any point of vessel $a$, for instance on the side or at the lower part of said vessel.

In the embodiment of Fig. 4, in order to reduce the cost of the apparatus, membrane $g$, projection $g^1$ (on which the push button $i$ is screwed) and piston $o$ are made of a single piece of moulded rubber.

Furthermore, in this embodiment, the end $o^1$ of piston $o$ is of pointed or recessed shape and engages into the end $c^1$ of the plunger tube $c$, when the parts are inactive, which ensures the guiding of piston $o$ in said plunger tube when push-button $i$ is depressed, even when the pressure exerted on button $i$ is oblique.

The distributing device shown by the drawings in Fig. 4 is more especially intended for mustard or an analogous matter.

Vessel $a$, which contains mustard, and which may be of any shape whatever, is closed by a stopper of cork, wood, etc. $k^1$ merely driven into the neck $a^1$ of the vessel and flush with the edge $a^2$ of said vessel. Through this stopper extends the plunger tube $c$, which is fixed, through conical engagement, gluing or screwing to a piece $e^1$ the under face of which rests upon the edge $a^2$ of the vessel and which may be fixed, for instance by gluing, to the upper face of stopper $k^1$. This piece $e^1$ is hollowed out so as to form a cup and it is provided, along its axis, with a tube $e^2$ which is joined to the plunger tube $c$.

In the axis of the chamber $e^0$ formed by the cup-shaped element $e^1$, I provide the stopping piston $o$ of rubber, made integral with membrane $g$ and projection $g^1$ on which the push button $i$ is screwed. The membrane is fixed in position by a hood or cover $f$ screwing on the neck $e^3$ of cup-shaped element $e^1$. The pointed end $o^1$ of piston $o$ is engaged, as shown by Fig. 1, in tubular part $e^2$, assembled to plunger tube $c$, whereby the piston is guided when membrane $g$ is depressed, by acting on push button $i$.

In a part of the periphery of cup-shaped member $e^1$, there is provided a threaded hole in which is screwed the end of the delivery tube $l$, preferably provided with a split nipple $m^1$ of rubber, as shown by Fig. 6. The base $m^2$ of this nipple is held against cup-shaped part $e^1$ merely by the screwing of tube $l$. The outer end of tube $l$ may be stopped by a small plug $s$.

Finally, air from the outside can penetrate into vessel $a$ above the pasty matter $b$, for instance by means of grooves $e^4$ and $k^2$ provided in pieces $e^1$ and $k^1$ respectively.

The operation of this distributing device takes place in the following manner:

The pasty matter, consisting for instance of mustard, fills a portion of vessel $b$ and also tube $c$ and the chamber $e^0$ of the cup-shaped chamber $e^1$. Under these conditions, when push button $i$ is depressed, a certain amount of matter is discharged, which passes through nipple $m^1$ and delivery tube or nozzle $l$, piston $o$ having been brought, immediately after the beginning of its downward stroke, into a position in which it stops plunger tube $c$.

As soon as push button $i$ is no longer depressed, membrane $g$ comes back into its initial position shown by Fig. 4, under the effect of its own elasticity, and a new quantity of matter passes, by suction, from vessel $a$ into chamber $o$.

The distributing device that has just been described has the very considerable advantage that it does not include any metallic valve or spring. Furthermore, the various pieces of which it is made may be made of wood or another non-metallic material, with the exception of the membrane and the nipple, which are made of rubber. Vessel $a$ is for instance made of sandstone or an analogous matter.

An advantage of the embodiment that has just been described consists in the fact that the part forming the distributing device proper, that is to say the cup-shaped piece with its membrane, its push button and its plunger tube, may be fitted, by means of a mere stopper, to a vessel of any kind whatever, and, in particular, to vessels existing already.

In the embodiment shown by Fig. 7, the charge of matter to be distributed is enclosed in a removable container $a^3$, for instance of cylindrical shape, preferably made of any cheap material such as cardboard, etc.

This container $a^3$ is normally closed by a lid $a^4$ (Fig. 9). Besides this lid, the container advantageously includes a ring-shaped part $n$ sliding freely with respect to the plunger tube $c$ and the inner wall of container $a^3$. This ring-shaped part $n$ is intended to scrape said wall and to drive before itself all the particles of matter $b$ that may adhere to the wall of the vessel as said matter is being discharged from said vessel.

The body $a^4$ of the distributing device shall be made of any shape as may be found preferable for giving it a nice appearance. In any case, it shall be provided, at its upper part, with threads ensuring its connection with lid $f^2$. This lid $f^2$ is so shaped as to accommodate membrane $g$ to which push button $i$ is fixed. This membrane is kept in position by the screwing of the dosing chamber $e$ in the lid $f^2$. To this dosing chamber is connected nozzle $l$ provided with its ball check valve $m$.

As shown by Fig. 7, the spring which, in other embodiments, serves to apply said ball against its seat (see for instance Fig. 1) may be dispensed with.

This is made possible owing to the fact that when the ball is to be applied against its seat, that is to say when membrane $g$ is moving upwardly, there is produced a strong suction in plunger tube $c$ and consequently in dosing chamber $e$. Due to this suction, the ball is drawn against its seat and this movement is helped by the action of the matter $b^1$ present in nozzle $l$, which matter is displaced by the action of the suction existing in chamber $e$. This displacement of the matter has also for its result to create, at the end of tube $l$, an empty space $l^1$ whereby said end of the tube is never soiled by the matter distributed and not used.

Obviously, when the distributing device is being used for the first time, that is to say when there is not any matter $b^1$ stored up in the discharge tube, it is necessary to start the operation of the apparatus by helping ball $m$ to come against its seat $m^3$ so as to act as a check valve. This can easily be done by suitably inclining the distributing device in such manner that, under the action of gravity, ball $m$ comes to rest upon its seat. Under these conditions, when push button $i$ is depressed, its subsequent upward movement causes matter $b$ to be drawn in into chamber $e$, which is thus filled with matter. The excess of matter passes through the bore of the ball seat $m$ and fills up tube $l$. The apparatus is then ready to operate.

In order to automatically produce this working of the check valve when using the distributing device for the first time, it suffices to arrange discharge tube $l$ as shown by Fig. 10 in which said tube is shown as occupying an inclined position with respect to the distributing device. With such an arrangement, when the apparatus is started, ball $m$, under the action of its own weight, comes back against its seat $m^3$. This seat may merely consist of the wall of the dosing chamber $e$.

In this Figure 10, I have shown an embodiment of a distributing device especially designed for use in connection with a vessel $a^5$ (generally of glass) containing a viscous matter $b$.

The lid $f^3$ may be made of wood or a moulded material and it is provided with a threaded portion $t$ intended to cooperate with the threaded part which usually exists at the upper part of glass vessels such as $a^5$.

This lid is provided with a second threaded portion $t^1$ in which dosing chamber $e$, fitted with its plunger tube $c$, is intended to be screwed. Of course, this chamber and its tube may be made of the same material as the lid $f^3$.

Membrane $g$ shall be held between lid $f^3$ and chamber $e$, in the usual manner.

When in the active or operative position, lid $f^3$ is not fully screwed on vessel $a^5$, whereby a small amount of air can flow in from the outside into vessel $a^5$ through the small play existing between threaded part $t$ and the threaded portion of vessel $a^5$.

It may be of interest to eliminate any risk of leakage of matter $b$ through this small play, and this more especially when the distributing device is to be carried in luggage. As a matter of fact, in such a case, matter $b$, when escaping from vessel $a^5$ might soil the objects stored or packed together with the distributing device in a bag or any other luggage. In order to obviate this drawback, lid $f^3$ shall be so shaped as to have a deep circular groove $u$ formed therein, at the bottom of which a packing ring $z$ shall be inserted.

Fluidtight closing shall then be obtained by fully screwing the lid on vessel $a^5$ the upper edge of which shall be strongly applied against packing ring $z$, thus wholly eliminating any risk of leakage.

Furthermore, a rubber cap $y$ shall be fitted on the end of the discharge tube $l$, with a view to preventing the matter $b^1$ present in said tube from escaping from said tube and eventually soiling objects packed together with the distributing device.

In order to reduce the cost of the apparatus and to simplify the machining operations to the maximum degree, it shall be advantageous to provide a rubber ring $v$ fixed to a boss $v^1$ of the ring-shaped member $n$ adapted to slide freely along plunger tube $c$. This arrangement shall make it possible to dispense with the necessity of too accurate an adjustment of the bore of said member $n$ with respect to said plunger tube, as would otherwise be necessary.

In a general way, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claims.

What I claim is:

1. A distributing device of the type described which comprises, in combination, a structure forming a chamber, a plunger tube carried by said structure adapted to be immersed, at its open lower end, in the matter to be distributed, said tube communicating freely, at its upper end, with said chamber, said chamber having an elastically deformable wall adapted to normally expand outwardly, manually operable means connected to said deformable wall, for pushing said wall inwardly, a piston carried by said membrane on the inner face thereof adapted to engage into said plunger tube, a discharge member, carried by said structure, opening outwardly and connected with the inside of said chamber, and outlet check valve means in said discharge member.

2. A distributing device according to claim 1 in which said manually operable means connected to said deformable wall, for pushing said wall inwardly consist of a flexible projection carried by said deformable wall vertically on the outer side thereof, and a push button fixed to the upper end of said flexible projection.

3. A distributing device according to claim 1 in which said manually operable means connected to said deformable wall, for pushing said wall inwardly include a flexible projection carried by said deformable wall vertically on the outer side thereof and a push button fixed to the upper end of said flexible projection said deformable wall consisting of a membrane the peripheral edge of which is fixed in a fluidtight manner to the wall of said chamber, said membrane, said projection and said piston being integral and consisting of a single piece of moulded rubber.

4. A distributing device according to claim 1 in which the end of said piston is of reduced section and protrudes into the upper part of the plunger tube.

5. A distributing device according to claim 1 in which said outlet valve means comprise an inwardly concave resilient nipple having a small opening.

6. A distributing device according to claim 1 in which said structure forms a plug adapted to be screwed upon the upper edge of a vessel intended to contain the matter to be distributed, said structure being provided with a circular groove adapted to accommodate said upper edge of the vessel in question, further including a packing ring in the bottom of said circular groove adapted to permit a fluidtight closing of said vessel by fully screwing said plug thereon, whereby said packing ring is compressed between said upper edge of the vessel and the bottom of said groove.

7. A distributing device according to claim 1 further including a hood carried by the lower end of said plunger tube so as to prevent the formation of an air pocket close to said plunger tube and to enlarge the region in which suction is exerted.

8. A material distributing device of the type described, which comprises a collapsible chamber having an inwardly deflectable wall, biassed to non-deflected position, unobstructed means opposite said wall for admitting material into said chamber, closure means on said deflectable wall adapted for sealing said unobstructed means when said wall is in its deflected position, and non-return means for discharging material out of said chamber.

9. A material distributing device of the type described, which comprises an open top hollow structure having an unobstructed bottom passage for admitting material into said hollow structure; an upwardly biassed resilient unit adapted to close the open top of said hollow structure, having integral piston means located opposite said bottom passage for sealing the latter when the resilient unit is depressed downwardly, means for securing operatively the unit to the hollow structure; and non-return means for discharging material out of said hollow structure.

10. A material distributing device of the type described, adapted for use in conjunction with a container for said material, which comprises in combination a collapsible chamber having an inwardly deflectable wall biassed to non-deflected position and an admission port opposite said wall, an unobstructed lead-in pipe for admitting material from said container into said collapsible chamber, means for uniting said pipe with said chamber in register with the admission port, closure means on said deflectable wall for sealing said admission port when said wall is deflected, and non-return means for discharging material out of said chamber.

11. A material distributing device, which comprises an open top hollow structure having an unobstructed bottom passage for admitting material into said hollow structure; a resilient wall for closing the open top of said hollow structure; means for securing said wall solely through its margin, to said hollow structure; inwardly projecting means on said resilient wall, opposite said passage, for closing the latter when the wall is deflected downwardly, said means being normally spaced apart from the port; and non-return means for discharging material out of said hollow structure.

12. A material distributing device, which comprises an open top hollow structure having an unobstructed bottom passage provided substantially centrally in said structure, for admitting material into said hollow structure; a resilient wall for closing the open top of said hollow structure, having a substantially centrally disposed plunger depending inwardly therefrom and normally extending opposite said passage to a point spaced apart from the same; means for bulging inwardly the central portion of said wall, so as to cause said plunger to engage and seal said passage; and non-return means for discharging material out of said hollow structure.

13. A material distributing device of the type described, which comprises an open top hollow rigid structure having an unobstructed bottom passage for admitting material into said hollow structure; a downwardly deflectable unit for closing the open top of said hollow structure, thus forming an internal chamber, said structure including a plunger adapted to seal said passage when the unit is downwardly deflected, and a flexible wall extending around said plunger; means for securing said unit solely through the margin of said flexible wall to the rigid hollow structure; spring means, extraneous to said internal chamber, for biassing said unit upwards; and non-return means for discharging material out of said hollow structure.

14. A material distributing device of the type described, which comprises an open top hollow structure having an unobstructed bottom passage for admitting material into said structure, a resilient wall adapted to close the open top of said structure said wall having a central opening, means for attaching said resilient wall to said structure, solely along the margin portion of said resilient wall, thus leaving free the center portion thereof around the central opening, an elongated member passing through said opening and protruding into said hollow structure as a plunger opposite said bottom passage, the plunger being adapted to seal said passage when the resilient wall is inwardly deflected, means for attaching said elongated member to said flexible wall, and non-return means for discharging material out of said hollow structure.

15. A material distributing device of the type described, which comprises an open top hollow structure having an unobstructed bottom passage for admitting material into said hollow structure; an upwardly biassed unit adapted to close the open top of said hollow structure, said unit including plunger means located opposite said bottom passage for sealing the same when the unit is depressed downwardly and an integral resilient distensible flange around said piston; means for attaching said unit to said hollow structure solely through the margin portion of said flange; and nonreturn means for discharging material out of said hollow structure.

16. The material distributing device of claim 15, the upwardly biassed unit comprising a downwardly concave cup-shaped rubber diaphragm and an integral downwardly projecting rubber piston having a reduced lower end, said reduced lower end being adapted normally to protrude into the bottom passage but to leave free space between it and said passage.

17. For pumping out of a container and dispensing a material adapted to flow, a pumping unit which comprises a pumping body having an unobstructed inlet and a check outlet, a flexible, inwardly depressible pumping diaphragm having its peripheral edge secured to said pumping body, and means on said diaphragm opposite said inlet for sealing the latter when the diaphragm is depressed inwardly.

18. A material distributing device of the diaphragm pump type, having a rigid hollow structure with an attached diaphragm, an inlet passage opposite the diaphragm and an outlet passage, in which device the parts movable in operation consist solely in the diaphragm which is made of rubber and has integral rubber means movable with said diaphragm for sealing the inlet passage when the diaphragm is depressed inwardly, and in a rubber split nipple fitted to the outlet passage in said rigid structure for the purpose set forth.

19. The combination of claim 9, the resilient unit further comprising an integral upper projection for the purpose set forth.

20. The combination of claim 14, the elongated member comprising a plunger adapted to be disposed below the resilient wall, a thrust transmission member for manual operation of said wall, adapted to be disposed above said resilient wall, and connecting means thinner than both the plunger and the thrust transmission member, adapted to be passed through the opening in said resilient wall, for assembling the plunger and the thrust transmission member into a unit, simultaneously nipping the resilient wall between them.

PAUL SERRE.